Patented Oct. 26, 1948

2,452,374

UNITED STATES PATENT OFFICE 2,452,374

ANACARDIC-ACROLEIN RESINS AND METHOD FOR THEIR PRODUCTION

Mortimer T. Harvey, South Orange, N. J., assignor to The Harvel Corporation, a corporation of New Jersey No Drawing. Application August 30, 1944, Serial No. 552,004

8 Claims. (Cl. 260—46)

This invention relates to novel compositions of matter and to methods for making and using the same. In one of its more specific aspects this invention is directed to novel products obtained by reacting acrolein with anacardic material and to methods for preparing the same.

In the course of my experimentations with acrolein I have discovered that resins may be produced by reacting acrolein with an anacardic material and that these resins in their fusible state are stable and are capable of being heat converted into infusible solids which are flexible, have good adhesion characteristics to metals, have high impact strength and are tough and have low brittleness characteristics. In the present description and claims anacardic material designates any one of the following: cashew nut shell liquid, distillate from cashew nut shell liquid and residue from cashew nut shell liquid and also the polymers thereof.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. patent to Edward R. Hughes, No. 2,058,456 of October 27, 1936, or it may be the so called treated cashew nut shell liquid obtained after the raw cashew nut shell liquid has been treated to reduce its vesicant action and to remove the naturally occuring metals therein as set forth in the patent to M. T. Harvey No. 2,128,247 of August 30, 1938, and to Harvey-Damitz 2,067,919 of January 19, 1937, to which reference is hereby made, or it may be either the raw or treated cashew nut shell liquid which has been steam distilled or distilled under vacuum at about 550° F.–600° F. to remove the more volatile constituents which measure about 5% by weight of the liquid treated.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled at between 600° F.–700° F. or distilled at 525° F.–700° F. under reduced pressure of about 50 mm. of mercury or at about 450° F. under reduced pressure of 10 mm. of mercury. By whatever method employed, the distillation is continued until the quantity by weight of the distillate is between about 25% to about 75% of the quantity by weight of the cashew nut shell liquid and the quantity by weight of the residue is between about 25% to about 75% of the quantity by weight of the cashew nut shell liquid. The distillate thus obtained for the most part consists of a phenol having an unsaturated hydrocarbon substituent having more than 13 carbon atoms and generally between 14 to 22 carbon atoms and having a boiling point of approximately 225° C. at 10 mm. of mercury pressure.

The polymerized cashew nut shell liquid may be prepared by whatever method is desired but for purposes of illustration reference is hereby made to the Harvey-Damitz Patents No. 2,128,247 of August 30, 1938, and 2,240,038 of April 29, 1941. The distillate and the residue may be polymerized in any desired manner and for purposes of illustration reference is made to the patent to S. Caplan 2,292,611 of August 11, 1942, and 2,317,585 of April 27, 1943.

In the practice of this invention acrolein is slowly added to a quantity of an anacardic material while being constantly stirred and allowed to cool during the additions because of an exothermic reaction which takes place when the acrolein is added to the anacardic material. After the desired amount of acrolein is added to the anacardic material there may be added to this mixture if desired a quantity of either an acid or basic condensing agent such as hydrochloric acid, sulphuric acid, ammonia or sodium hydroxide. While the condensing agent addition may be omitted, I prefer to employ a mineral acid condensing agent in such quantity that the pH of the mixture is between about 2 and 5. The ratio by weight of the acrolein to the anacardic material in the mixture for commercial purposes is preferably between about 1 to 10 and 2 to 1. After this mixture has been made as above set forth and the acid condensing agent added thereto, the mixture is preferably heated at an elevated temperature of roughly 80° C. or above and maintained at this temperature until there is produced a fusible organic condensation reaction product capable of being heat converted to the infusible and solid state. While this heating may be carried out with the mixture at atmospheric pressure or superatmospheric pressure, in commercial practice I prefer to carry out the reaction at atmospheric pressure and while the temperatures employed may vary depending on the speed of reaction desired, I prefer to employ temperatures between about 80° C. and 125° C.

The fusible resinous condensation reaction products of acrolein and anacardic material vary in viscosity depending upon the temperature and time of heating at the temperature employed. I prefer to maintain said mixture at said elevated temperatures until the viscosity of the mixture has increased at least about 100% although it is within the contemplation of this invention to produce fusible masses of even higher viscosities, wherein the fusible resins may be of a heavy molasses consistency and also practically solid. The fusible resins so produced may be converted to the solid infusible state when heated at 105° C. for 48 hours. The solid infusible resinous condensation reaction products of acrolein and anacardic material have impact strength, good adhesion to metal, low brittleness and good flexibility characteristics and high heat resistance.

My novel resinous organic condensation reaction products of acrolein and anacardic material find various and sundry applications in a number of different fields among which are: (a) as plasticizers for a rubbery material such as natural or reclaimed rubber as well as for "Buna-N" the copolymers of butadiene 1,3 and acrylonitrile and for "Buna-S" the copolymers of butadiene 1,3 and styrene; (b) plasticizer for ethyl cellulose which so plasticized ethyl cellulose may be intimately admixed with any of the aforesaid rubbery materials; (c) as impregnating and coating materials for wood, stone, metals, fabrics and the like and particularly for woven asbestos fabric or asbestos boards used for brake linings and clutch facings and also for electrical coils, magnets and conductors; (d) as a laminating material for paper, wood, cloth or the like, (e) as addition to phenol-formaldehyde, furfuryl alcohol-formaldehyde, furfuryl alcohol-glyoxal fusible resins to improve their impact strength when converted to the infusible state.

The following examples are given merely to illustrate the invention and are not to be construed in a limiting sense.

*Example 1*

300 grams of cashew nut shell liquid—slightly acid, treated by heating to give a viscosity of around 400–600 cp. at 25° C. allowing the residual acidity to remain in the product, and 60 grams of acrolein were mixed together. When the mixture became hot due to an exothermic reaction, it was allowed to stand 24 hours. It was then heated to about 125° C. to obtain a thick viscous mass resembling heavy molasses. This thick mass is a fusible resin capable of being converted to the dry, solid and infusible state by heating at 105° C. for 48 hours. The fusible resin may be thinned with mineral spirits to make an impregnating varnish or coating.

*Example 2*

150 grams raw commercial cashew nut shell liquid and 15 grams of 10% NaOH solution added and stirred together. Then 120 grams of acrolein was added under reflux condenser to that mix. Small amounts of acrolein were added at a time with stirring because of the extreme vigorous reaction which takes place. After all the acrolein had then been carefully added allowing the reaction to take place during the addition, the mass was then heated to about 100° C. until there was obtained a thick viscous material which was a fusible resin capable of being converted to the dry solid infusible state by heating at 105° C. for about 48 hours. To the fusible resin may be added approximately 1½ times by weight of a solvent such as mineral spirits or toluol and the water of reaction then removed in the usual manner with a side arm separator. When the water has been removed, at a temperature of approximately 100° C., the material is cooled and used as an insulation resin varnish. It cures in 16 hours at 105° C. The material can also be used as an impregnant for addition to phenol-formaldehyde resins to improve their impact strength when used in molding powders and laminated products.

*Example 3*

300 grams of acid polymerized cashew nut shell liquid whose viscosity is approximately 50,000–100,000 cp. at 25° C. the acidity of polymerization being allowed to remain in the mixture, 500 grams of toluol, and 60 grams of acrolein are added under reflux condenser and heated at about 125° C. under said reflux condenser for about two hours. The water of reaction is then removed by a side-arm separator attached to the reflux condenser and the excess solvent removed until the remaining mixture is approximately 50–60% solids. This material containing a resinous organic condensation reaction product in the fusible state may be spread on cloth, paper or material, dried and heat converted to the infusible solid state by employing temperature range from 100° C.–300° C. to give tough, adhering coatings.

*Example 4*

300 grams of cashew nut shell liquid residue which has been obtained by heating under vacuum, by steam or open distillation cashew nut shell liquid until the quantity by weight of the residue is 50% of that of the original material, and while hot 600 grams of water containing 3 grams of sodium hydroxide are added slowly to said residue and the whole mass emulsified with rapid stirring or by means of an emulsifier. To this emulsion is slowly added 60 grams of acrolein and the whole emulsified mass is then heated at 125° C. to form the fusible resinous reaction product without breaking the emulsification. This product may be spread on paper, cloth and fabrics, dried, and converted to the infusible solid state by application of heat at a temperature range from 80° C.–300° C.

*Example 5*

| | Parts |
|---|---|
| Phenol 92° | 348 |
| Distillate of cashew nut shell liquid having a boiling point of approximately 225° C. at 10 mm. of mercury pressure. (This distillate may be produced by steam or vacuum distilling cashew nut shell liquid until the quantity by weight of the distillate is about 25–75% of the original quantity by weight of the cashew nut shell liquid.) | 320 |
| Acrolein | 240 |
| Ammonia | 18 | were refluxed for 2 hours at approximately 100° C. Then the mass is dehydrated at about 100° C. under vacuum until a thick viscous mass is produced. This thick mass is a fusible resin and may be thinned with alcohol to obtain a 50–60% solids and this so produced resin varnish may be used for coatings on paper and cloth to be further heat dried and converted to the infusible solid state under heat or heat and pressure to obtain laminated products of high impact strength.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. The method for producing a resinous organic condensation reaction product comprising heating at 80° C.–125° C. a mixture of acrolein, an anacardic material selected from the group consisting of cashew nut shell liquid and its polymers, distillates of cashew nut shell liquid and their polymers, residues of cashew nut shell liquid and their polymers, said distillates having a boiling point of approximately 225° C. at 10 mm. of mercury pressure, said residues obtained by heat distilling cashew nut shell liquid until the quantity by weight of said residue is between 25% to 75% of the quantity by weight of said cashew nut shell liquid, and a condensing agent, the ratio by weight of said acrolein to said anacardic material in said mixture being in the range of 1–10 to 2–1, said heating continued until said resinous organic condensation reaction product is produced.

2. A resinous organic condensation reaction product produced according to claim 1.

3. The method for producing a resinous organic condensation reaction product comprising heating at 80° C.–125° C. a mixture of acrolein, cashew nut shell liquid and a condensing agent, the ratio by weight of said acrolein to said cashew nut shell liquid in said mixture being in the range of 1–10 to 2–1, said heating continued until said resinous organic condensation reaction product is produced.

4. A resinous organic condensation reaction product produced according to claim 3.

5. The method for producing a resinous organic condensation reaction product comprising heating at 80° C.–125° C. a mixture of acrolein, polymerized cashew nut shell liquid and a condensing agent, the ratio by weight of said acrolein to said polymerized cashew nut shell liquid in said mixture being in the range of 1–10 to 2–1, said heating continued until said resinous organic condensation reaction product is produced.

6. A resinous organic condensation reaction product produced according to claim 5.

7. The method for producing a resinous organic condensation reaction product comprising heating at 80° C.–125° C. a mixture of acrolein, a distillate of cashew nut shell liquid having a boiling point of approximately 225° C. at 10 mm. of mercury pressure, and a condensing agent, the ratio by weight of said acrolein to said distillate of cashew nut shell liquid in said mixture being in the range of 1–10 to 2–1, said heating continued until said resinous organic condensation reaction product is produced.

8. A resinous organic condensation reaction product produced according to claim 7.

MORTIMER T. HARVEY.

REFERENCES CITED

The following references are of record in the file of this patent:

UNITED STATES PATENTS

| Number | Name | Date |
|---|---|---|
| 1,607,293 | Moureau et al. | Nov. 6, 1926 |
| 2,078,617 | Spokes | Apr. 27, 1937 |
| 2,306,077 | Novotny et al. | Dec. 22, 1942 |